(12) United States Patent
Lin

(10) Patent No.: US 6,474,211 B1
(45) Date of Patent: Nov. 5, 2002

(54) SAW-BLADE DRIVING DEVICE FOR A SCROLL SAW

(75) Inventor: Zhi-Cheng Lin, Taichung Hsien (TW)

(73) Assignee: P & F Brother Industrial Corporation, Taichung (TW)

(*) Notice: Subject to any disclaimer, the term of this patent is extended or adjusted under 35 U.S.C. 154(b) by 137 days.

(21) Appl. No.: 09/687,592

(22) Filed: Oct. 13, 2000

(51) Int. Cl.$^7$ .................... B27B 19/04; B27B 11/08
(52) U.S. Cl. .................... 83/783; 83/781; 83/628; 83/630; 83/632; 83/699.21
(58) Field of Search .................. 83/783, 776, 777, 83/779, 781, 602, 604, 628, 630, 632, 647, 699.21, 698.71

(56) References Cited

U.S. PATENT DOCUMENTS

| | | | | |
|---|---|---|---|---|
| 267,449 A | * | 11/1882 | Nixon | 83/779 |
| 1,623,673 A | * | 4/1927 | Grose | 83/632 |
| 1,826,983 A | * | 10/1931 | Beebe | 83/777 |
| 2,327,239 A | * | 8/1943 | Bartlett | 83/783 X |
| 2,646,089 A | * | 7/1953 | Gaskell | 83/777 X |
| 3,631,751 A | * | 1/1972 | Stumpf | 83/647 X |
| 3,863,342 A | * | 2/1975 | Griffies et al. | 83/647 X |
| 4,825,741 A | * | 5/1989 | Wellington et al. | 83/781 X |
| 4,841,823 A | * | 6/1989 | Brundage | 83/781 |
| 5,228,376 A | * | 7/1993 | Huang | 83/781 |
| 5,390,577 A | * | 2/1995 | Huang | 83/628 X |
| 5,410,933 A | * | 5/1995 | Miyamoto et al. | 83/783 |
| 5,778,752 A | * | 7/1998 | Chen | 83/783 |
| 5,992,283 A | * | 11/1999 | Chen | 83/783 X |
| 6,067,886 A | * | 5/2000 | Irwin | 83/628 X |
| 6,234,056 B1 | * | 5/2001 | Oslick | 83/783 X |

* cited by examiner

*Primary Examiner*—Charles Goodman
(74) *Attorney, Agent, or Firm*—Townsend and Townsend and Crew LLP

(57) ABSTRACT

A scroll saw includes a machine base and a table mounted pivotally on the machine base for placement of a workpiece to be sawn. The table is rotatable about a horizontal axis that extends in a longitudinal direction of the machine base. A C-shaped blade-holding arm is fixed on the machine base, and has upper and lower arm portions that extend in the longitudinal direction of the machine base. A saw blade is held between front ends of the upper and lower arm portions of the blade-holding arm, and extends perpendicularly through the table. A saw-blade driving device includes a motor which is disposed within the machine base, and which is provided with a motor shaft. The motor shaft extends in the longitudinal direction of the machine base. A linkage interconnects the motor shaft and the saw blade so as to reciprocate the saw blade relative to the blade-holding arm.

6 Claims, 8 Drawing Sheets

SAW-BLADE DRIVING DEVICE FOR A SCROLL SAW

BACKGROUND OF THE INVENTION

1. Field of the Invention

The invention relates to a scroll saw, more particularly to a saw-blade driving device for a scroll saw.

2. Description of the Related Art Referring to

FIGS. 1 and 2, a conventional scroll saw is shown to include an elongated machine base 10, a table 11, a C-shaped blade-holding arm 12, a generally vertical saw blade 15, and a saw-blade driving device.

As illustrated, the table 11 is mounted pivotally on the machine base 10, and is adapted for placement of a workpiece to be sawn such that the table 11 is rotatable about a horizontal axis that extends in a longitudinal direction of the machine base 10.

The blade-holding arm 12 is fixed on the machine base 10, and has upper and lower arm portions 121, 122 that extend in the longitudinal direction of the machine base 10. The saw blade 15 is held between front ends of the upper and lower arm portions 121, 122 of the blade-holding arm 12 via two chucks 14, and extends perpendicularly through the table 11. The saw-blade driving device includes a motor 16, and a linkage consisting of an upper swing arm 13, a lower swing arm 13", a generally vertical driving rod 18, a counterweight plate 17, and a crankpin 162. The motor 16 is disposed in the machine base 10 below the table 11, and has a motor shaft 160 which extends in a transverse direction of the machine base 10. The motor shaft 160 is shaped as a crankshaft, and is provided with the crankpin 162. The counterweight plate 17 is sleeved fixedly on the motor shaft 160. The upper and lower swing arms 13, 13" extend in the longitudinal direction of the machine base 10, and have middle portions that are disposed pivotally and respectively on the upper and lower arm portions 121, 122 of the blade-holding arm 12 so that the upper and lower swing arms 13, 13" respectively rotate about two horizontal axes which extend in the transverse Direction of the machine base 10, front ends provided with the chucks 14 for holding upper and lower ends of the saw blade 15, and two rear ends connected pivotally to each other by means of a vertical link (not visible) for synchronous movement. The driving rod 18 has an upper end connected pivotally to the lower swing arm 13" adjacent to the front end thereof, and a lower end connected pivotally to the crankpin 162. Under this condition, rotation of the motor shaft 160 results in reciprocal and vertical movement of the driving rod 18 relative to the machine base 10 and consequently reciprocates the saw blade 15 on the blade-holding arm 12.

One disadvantage that results from the use of the aforesaid conventional scroll saw resides in that in order to form bevel surfaces on the workpiece (not shown) during the sawing operation, the table 11 is tilted. Collision between the table 11 and the motor 16 is thus possible since the motor 16 extends from the machine base 10 in the transverse direction, thereby adversely affecting the sawing operation.

SUMMARY OF THE INVENTION

Therefore, the object of this invention is to provide a scroll saw which is clear of the aforementioned drawback that results from the use of the conventional scroll saw.

Accordingly, the scroll saw of the present invention includes an elongated machine base, a table, a C-shaped blade-holding arm, a generally vertical saw blade, and a saw-blade driving device. The table is mounted pivotally on the machine base, and is adapted for placement of a workpiece to be sawn, and is rotatable about a horizontal axis that extends in a longitudinal direction of the machine base. The C-shaped blade-holding arm is fixed on the machine base, and has upper and lower arm portions that extend in the longitudinal direction of the machine base and that have front ends. The saw blade is held between the front ends of the upper and lower arm portions of the blade-holding arm, and extends perpendicularly through the table. The saw-blade driving device includes a motor and a linkage. The motor is disposed within the machine base, and is provided with a motor shaft that extends in the longitudinal direction of the machine base. The linkage interconnects the motor shaft and the saw blade so as to reciprocate the saw blade relative to the blade-holding arm.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
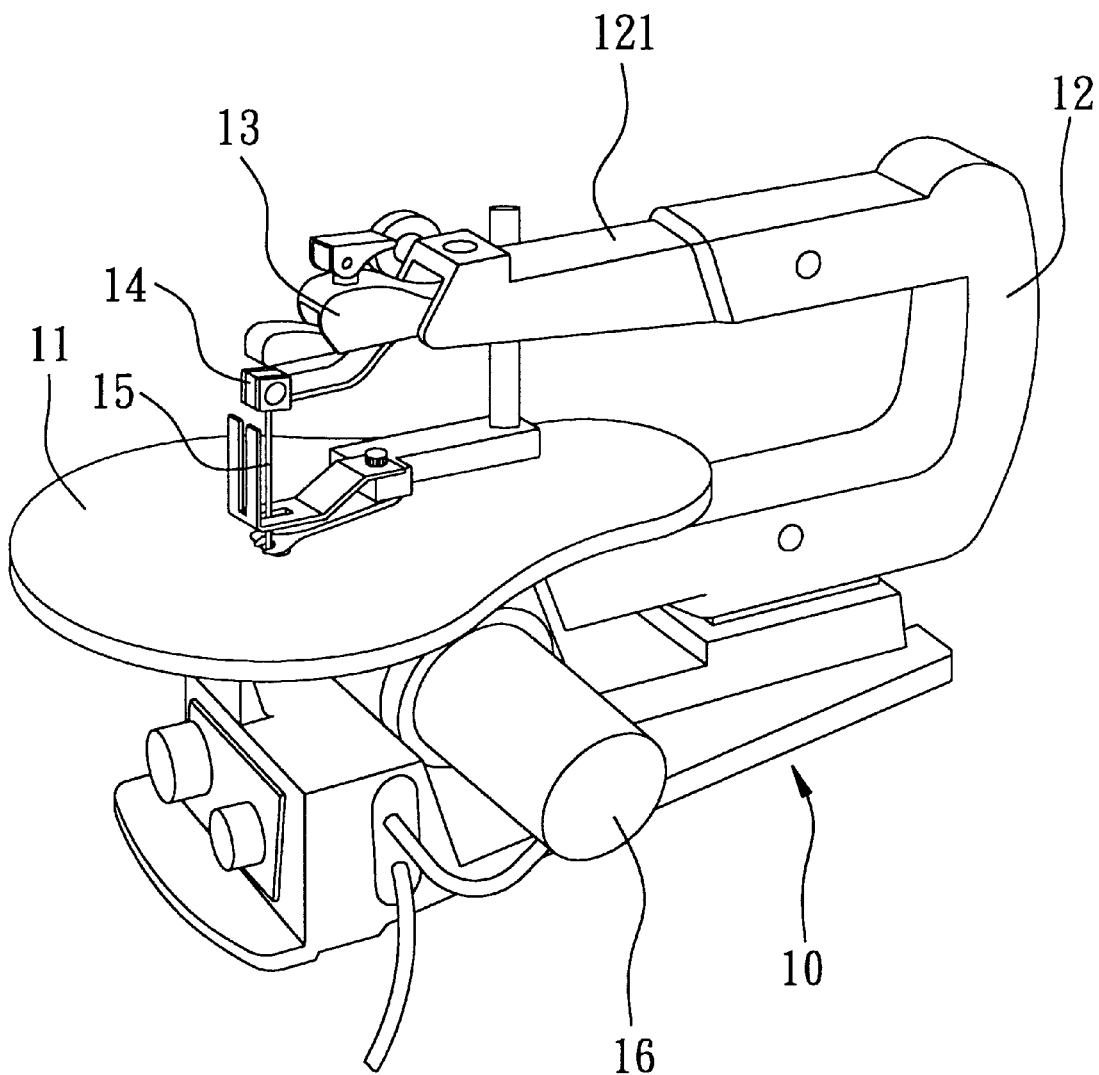
FIG. 1 is a perspective view of a conventional scroll saw.
Figure 2:
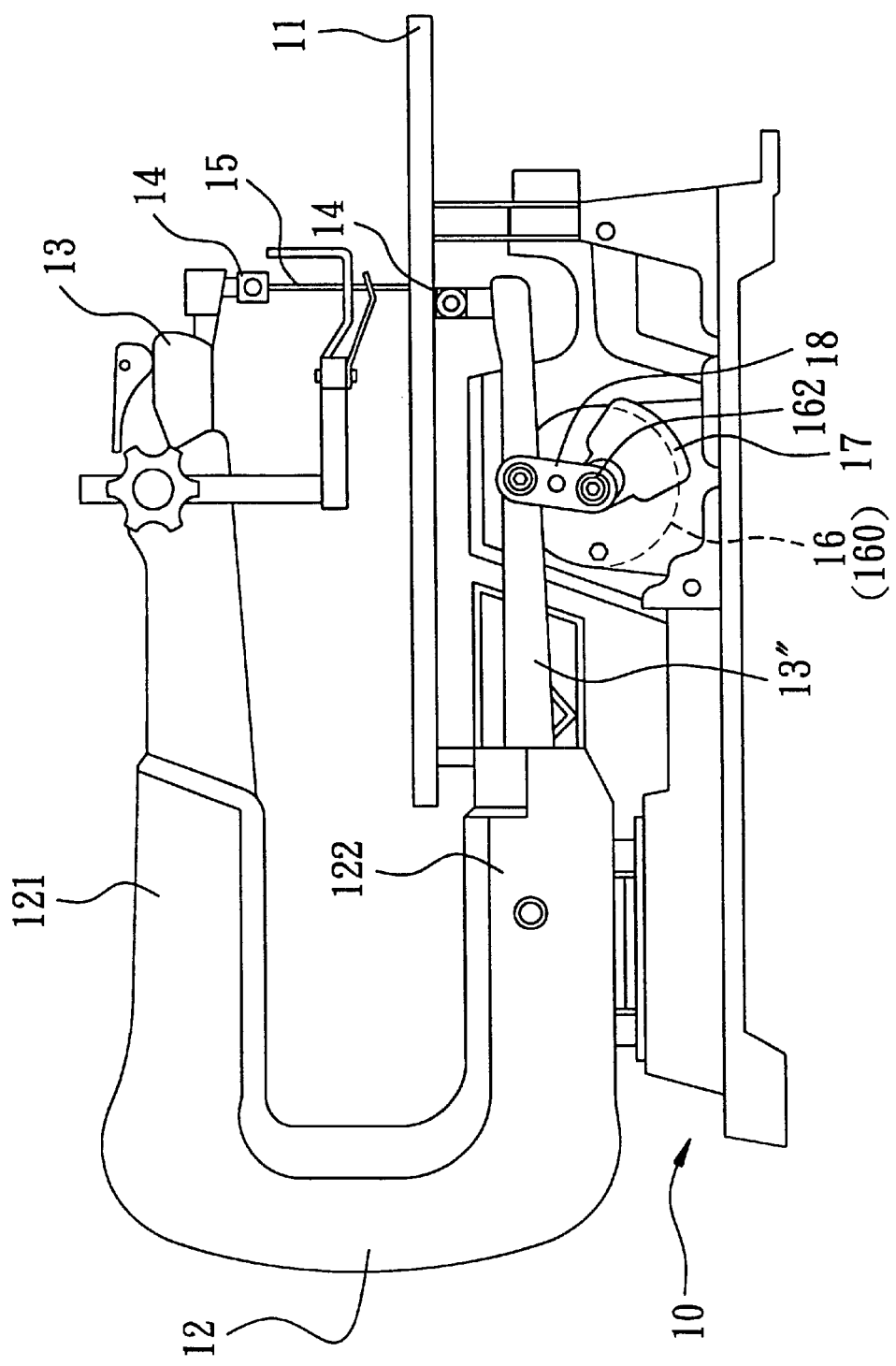
FIG. 2 is a schematic side view of the conventional scroll saw of FIG. 1, illustrating how upper and lower swing arms for driving a saw blade are connected to a motor shaft therein.
Figure 3:
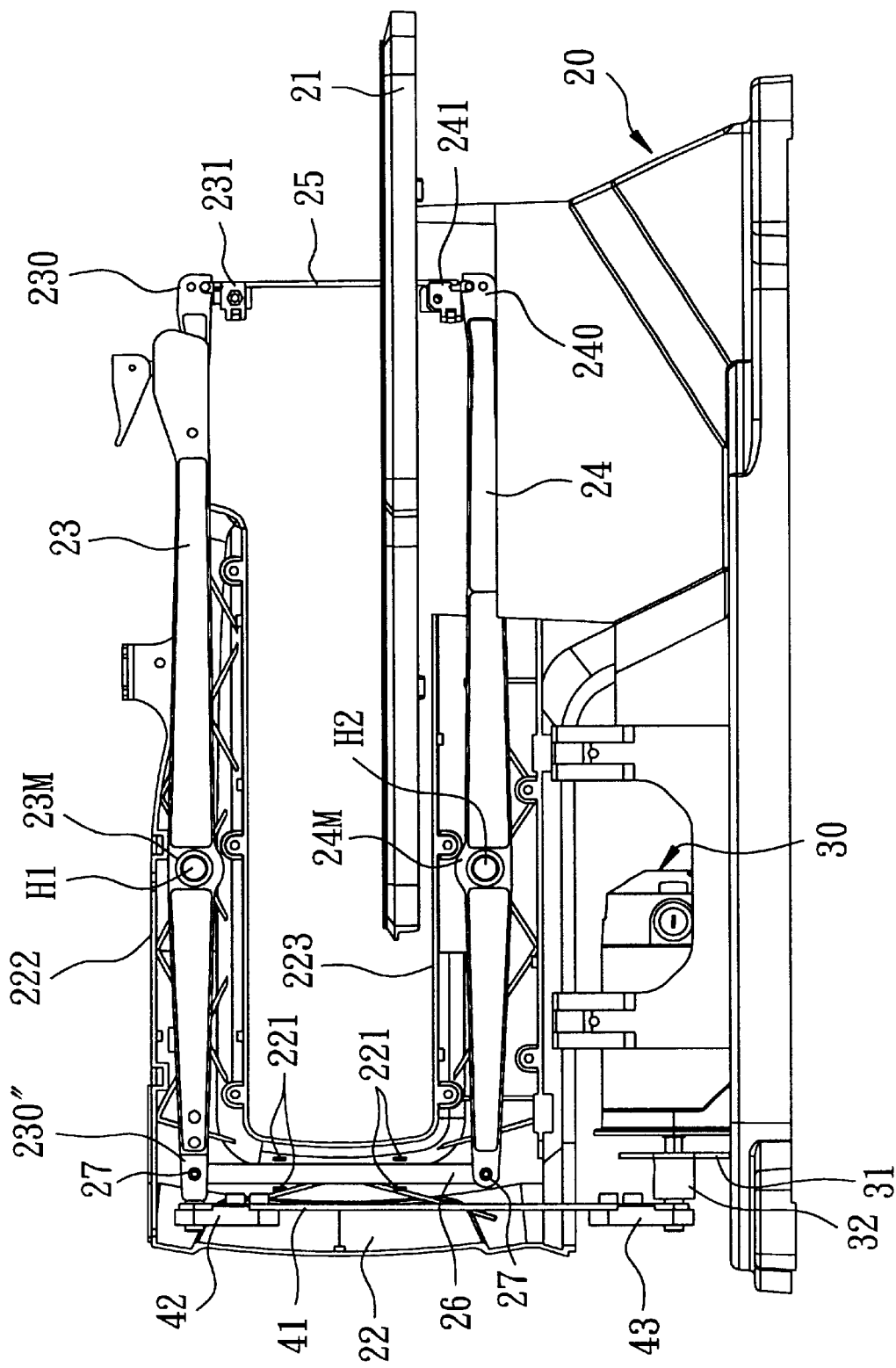
FIG. 3 is a schematic side view of a preferred embodiment of a scroll saw according to the present invention.
Figure 4:
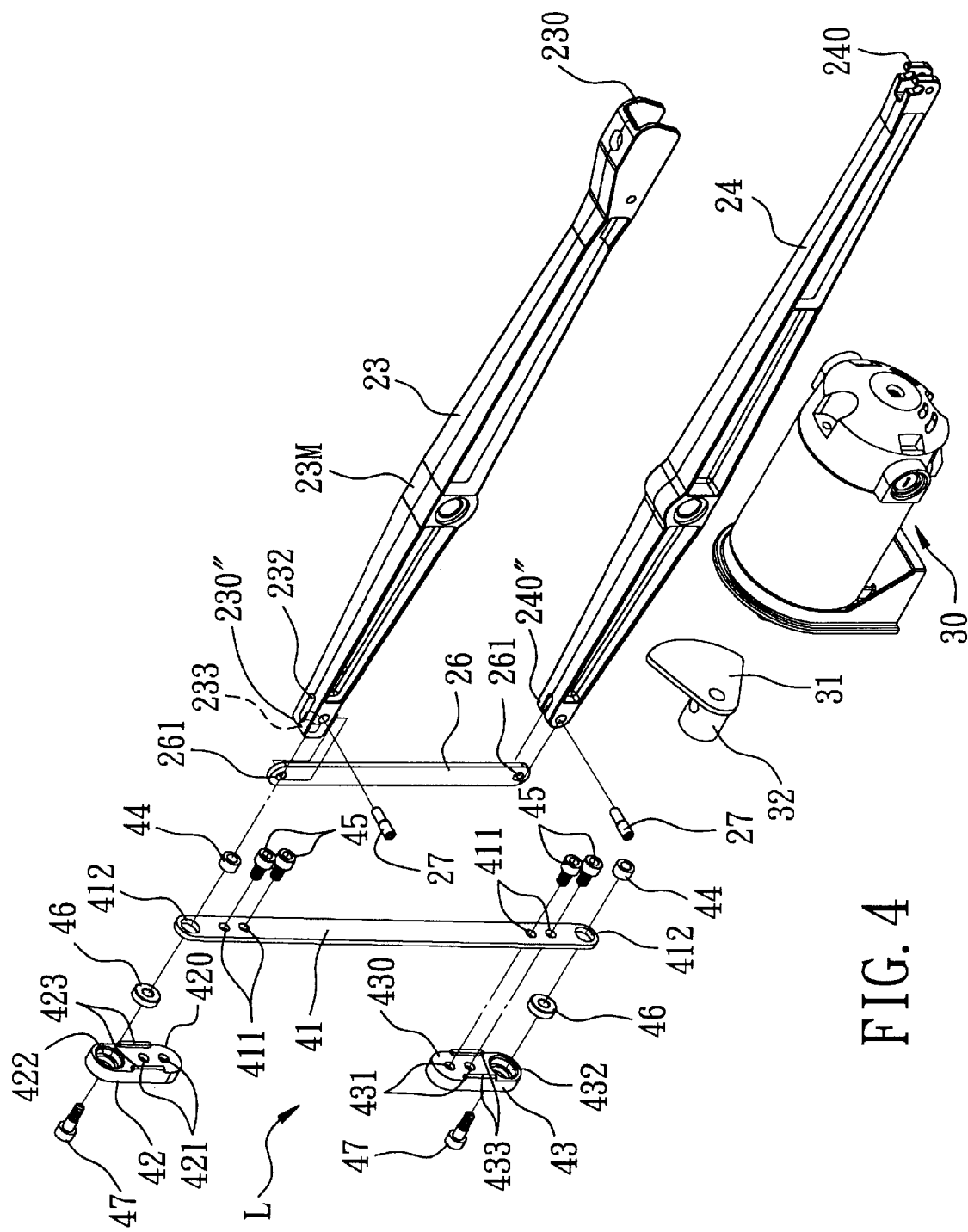
FIG. 4 is an exploded, perspective view of a saw-blade driving device employed in the preferred embodiment.

Referring to FIGS. 3 to 6, the preferred embodiment of a scroll saw of the present invention is shown to include an elongated machine base 20, a table 21, a C-shaped blade-holding arm 22, a generally vertical saw blade 25, and a saw-blade driving device.

As illustrated, the table 21 is mounted pivotally on the machine base 20, and is adapted for placement of a workpiece to be sawn. The table 21 is rotatable about a horizontal axis that extends in a longitudinal direction of the machine base 20.

The blade-holding arm 22 is fixed on the machine base 20, and has upper and lower arm portions 222, 223 that extend in the longitudinal direction of the machine base 20 and that have front ends.

The vertical saw blade 25 is held between the front ends of the upper and lower arm portions 222, 223 of the blade-holding arm 22, and extends perpendicularly through the table 21.

The saw-blade driving device includes a motor 30 and a linkage (L). The motor 30 is disposed within the machine base 20, and is provided with a motor shaft 301 that extends in the longitudinal direction of the machine base 20. The linkage (L) interconnects the motor shaft 301 and the saw blade 25 so as to reciprocate the saw blade 25 relative to the blade-holding arm 22.

Preferably, the motor shaft 301 is provided with an eccentric wheel member 32 that is sleeved fixedly and eccentrically thereon.

The linkage (L) includes an upper swing arm 23, a lower swing arm 24, a generally vertical link 26, horizontal upper and lower pivot pins 27, a driving rod 41, and upper and lower spherical plain bearings 46. The upper swing arm 23 has a middle portion (23M) (see FIG. 3) that is disposed pivotally within the upper arm portion 222 of the blade-holding arm 22 so that the upper swing arm 23 rotates about a horizontal axis (H1) that extends in a transverse direction of the machine base 20, a front end 230 with an upper chuck 231 that is connected thereto in a known manner and that holds an upper end of the saw blade 25 thereon, and a rear end 230". The lower swing arm 24 has a middle portion (24M) that is disposed pivotally within the lower arm portion 223 of the blade-holding arm 22 so that the lower swing arm 24 rotates about another horizontal axis (H2) that extends in the transverse direction of the machine base 20, a front end 240 with a lower chuck 241 that is connected thereto in a known manner and that holds a lower end of the saw blade 25 10 thereon, and a rear end 240". The upper pivot pin 27 connects an upper end 261 of the link 26 rotatably to the rear end 230" of the upper swing arm 23. The lower pivot pin 27 connects a lower end 261 of the link 26 rotatably to the rear end 240" of the lower swing arm 24. The upper spherical plain bearing 46 interconnects the rear end 230" of the upper swing arm 23 and an upper end of the driving rod 41. The lower spherical plain bearing 46 interconnects the eccentric wheel member 32 and a lower end of the driving rod 41 so as to rotate the lower end of the driving rod 41 about the motor shaft 301, thereby moving the upper end of the driving rod 41 vertically relative to the machine base 20 and consequently swinging the upper and lower swing arms 23, 24 reciprocally.

The motor 30 further includes a counterweight plate 31 that is sleeved fixedly on the motor shaft 301 and that is formed integrally with the eccentric wheel member 32. The rear end of the upper swing arm 23 is formed with a link-extension hole 232 for extension of the upper end 261 of the link 26 therethrough.

The driving rod 41 further has an upper sleeve-accommodating hole 412 formed through the upper end thereof, and two upper fastener holes 411 that are formed therethrough below the upper sleeve-accommodating hole 412 and that are arranged one above another. The upper swing arm 23 further has a rear end surface that is formed with a threaded hole 233.

The linkage (L) further includes an upper coupler 42, two upper set screws 45, an upper spacer sleeve 44, and an upper lock bolt 47. The upper coupler 42 has a side surface 420 that includes two threaded holes 421, a bearing-accommodating counterbore 422 for receiving the upper spherical plain bearing 46 therein, and two parallel ribs 423 that are formed on two opposite sides of the side surface 420 of the upper coupler 42 so as to define a rod-confining space therebetween, within which the upper end of the driving rod 41 is received fittingly. The upper end of the driving rod 41 is located between the upper coupler 42 and the rear end 230" of the upper swing arm 23. The upper set screws 45 extend through the upper fastener holes 411 in the driving rod 41 to engage the threaded holes 421 in the upper coupler 42, thereby fixing the upper coupler 42 to the upper end of the driving rod 41. The upper spacer sleeve 44 is confined rotatably within the upper sleeve-accommodating hole 412 in the driving rod 41. The upper lock bolt 47 extends through the counterbore 422 in the upper coupler 42, the upper spherical plain bearing 46, and the upper spacer sleeve 44 to engage the threaded hole 233 in the rear end surface of the upper swing arm 23. Under this condition, the upper spherical plain bearing 46 moves vertically and reciprocally relative to the machine base 20 when the motor shaft 301 rotates.

Preferably, the driving rod 41 has a lower sleeve-accommodating hole 412 formed through the lower end thereof, and two lower fastener holes 411 that are formed therethrough above the lower sleeve-accommodating hole 412 and that are arranged one above another. The eccentric wheel member 32 preferably has a rear end surface that is formed with a threaded hole 321 in a center thereof.

Figure 5:
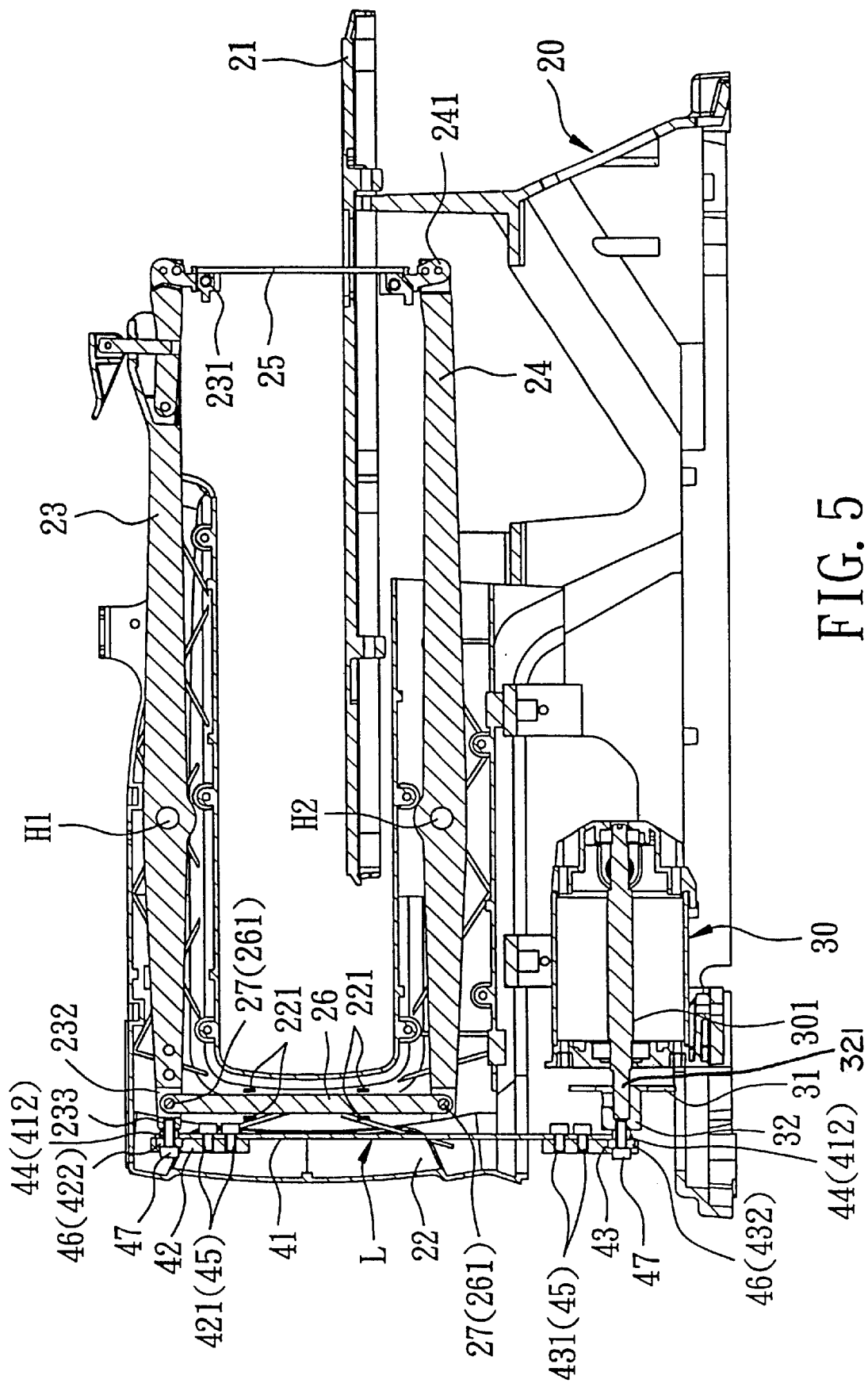
FIG. 5 is a fragmentary sectional view of the preferred embodiment, illustrating connection between the saw blade and a motor of the saw-blade driving device.
Figure 6:
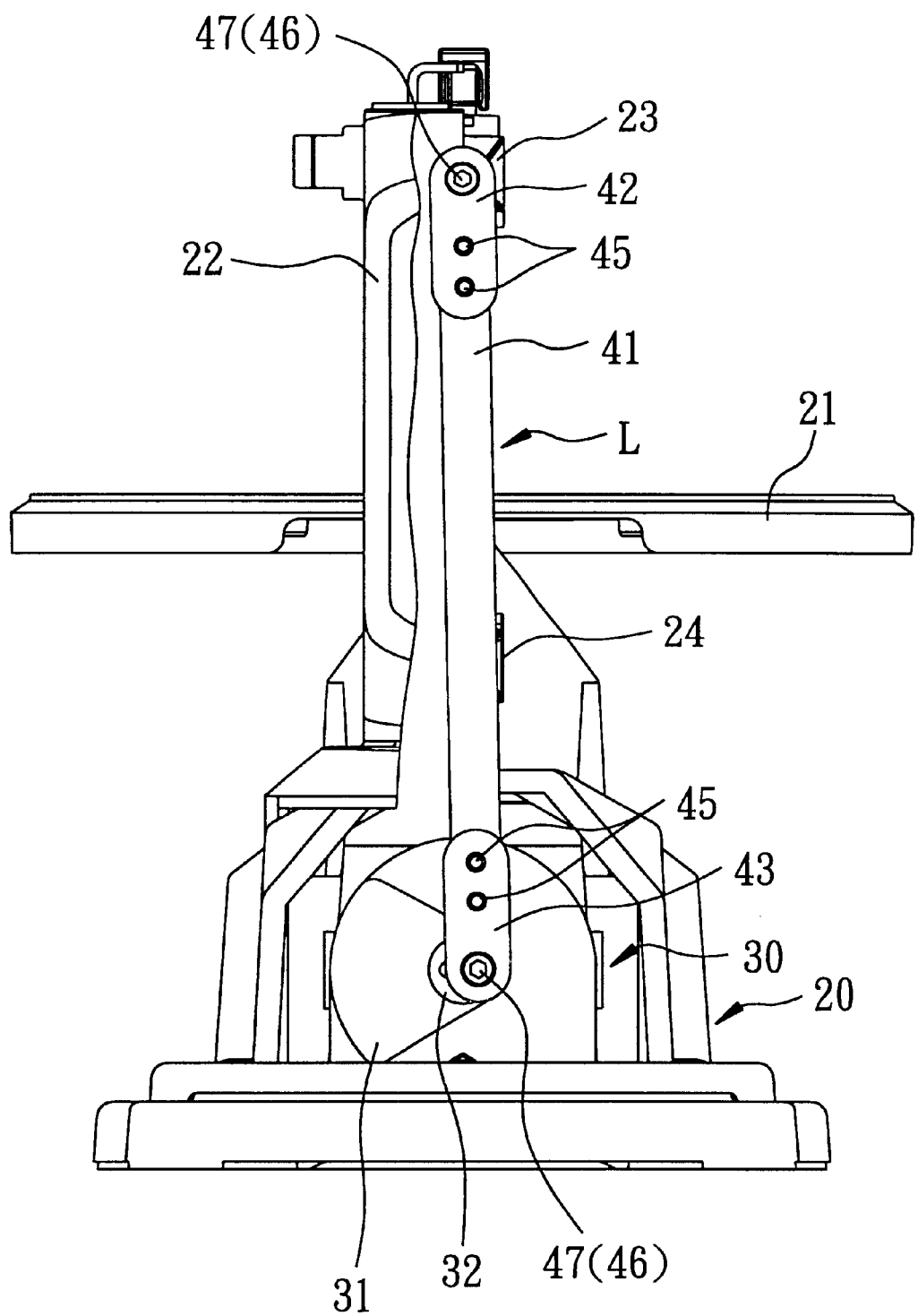
FIG. 6 is a rear side view of the preferred embodiment, illustrating how upper and lower swing arms for swinging the saw blade are connected to the motor shaft.
Figure 7:
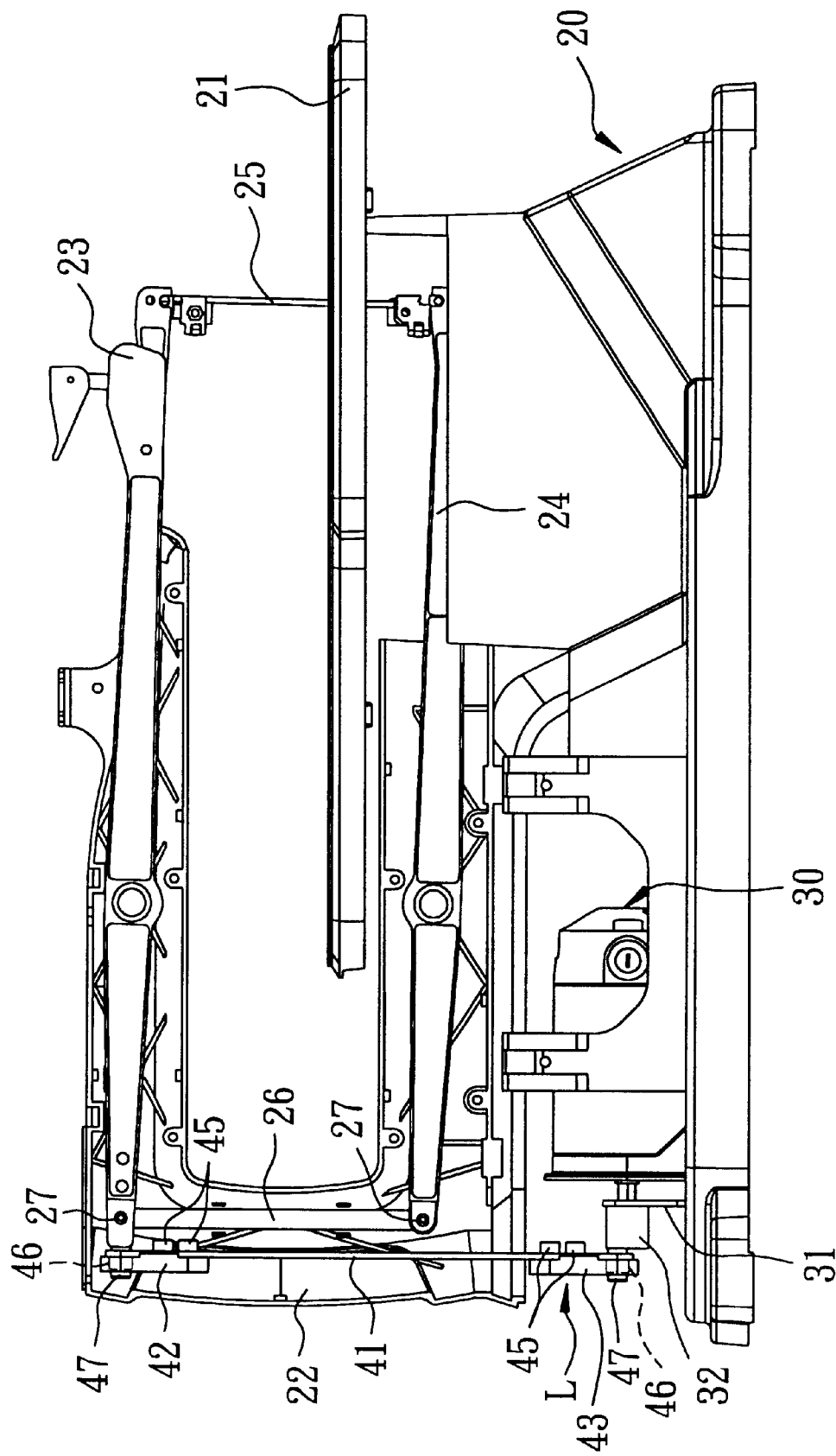
FIG. 7 is a lateral side view of the preferred embodiment, illustrating how the upper and lower swing arms are connected to the motor shaft.

The linkage (L) of the preferred embodiment further includes a lower coupler 43, two lower set screws 45, a lower spacer sleeve 44, and a lower lock bolt 47. The lower coupler 43 has a side surface 430 that includes two threaded holes 431, a bearing-accommodating counterbore 432 for receiving the lower spherical plain bearing 46 therein, and two parallel ribs 433 that are formed on two opposite sides of the side surface 430 of the lower coupler 43 so as to define a rod-confining space therebetween, within which the lower end of the driving rod 41 is received fittingly. The lower end of the driving rod 41 is located between the lower coupler 43 and the eccentric wheel member 32, as shown in FIG. 5. The lower set screws 45 extend through the lower fastener holes 411 in the driving rod 41 to engage the threaded holes 431 in the lower coupler 43, thereby fixing the lower coupler 43 to the lower end of the driving rod 41. The lower spacer sleeve 44 is confined rotatably within the lower sleeve-accommodating hole 412 in the driving rod 41. The lower lock bolt 47 extends through the counterbore 432 in the lower coupler 43, the lower spherical plain bearing 46, and the lower spacer sleeve 44 to engage the threaded hole 321 in the rear end surface of the eccentric wheel member 32.

The blade-holding arm 22 further includes a plurality of vertically spaced pairs of adjacent limiting projections 221, each pair of the adjacent limiting projections 221 flank and are spaced apart from the link 26, thereby permitting vertical movement of the link 26 between the limiting projections 221.

Figure 8:
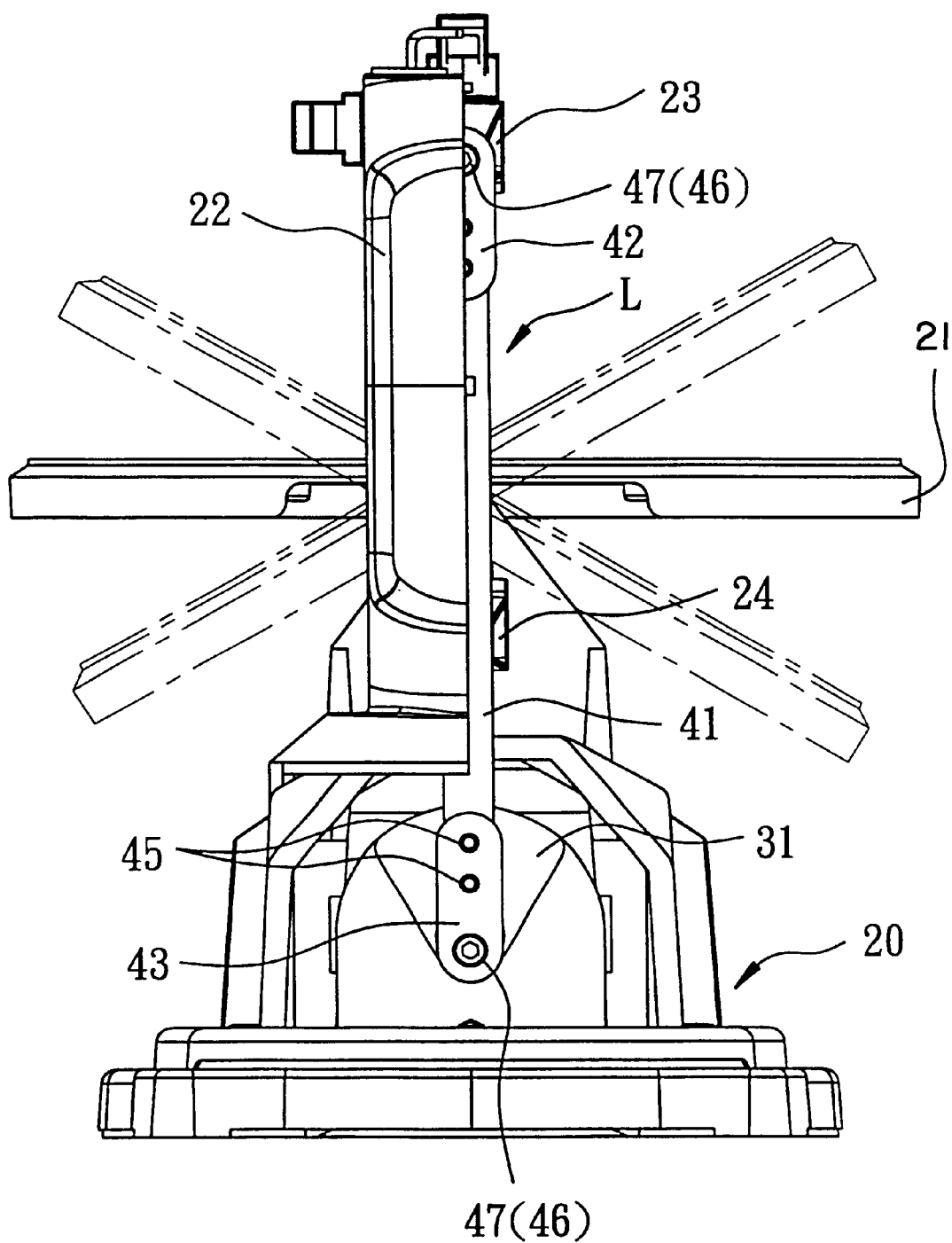
FIG. 8 is a rear side view of the preferred embodiment, illustrating how a table for holding a workpiece to be sawn is tilted relative to a machine base in order to form bevel surfaces on the workpiece.

As shown in FIG. 8, the dotted lines illustrate tilting positions of the table 21 relative to the machine base 20. Since the motor 30 is disposed in the machine base 20 at the rear end thereof, and since the motor shaft 301 extends in the longitudinal direction of the machine base 20, collision of the table 21 with the motor shaft 301 during a tilting operation can be avoided.

With this invention thus explained, it is apparent that numerous modifications and variations can be made without departing from the scope and spirit of this invention. It is therefore intended that this invention be limited only as indicated in the appended claims.

I claim:
1. A scroll saw comprising:
an elongated machine base;
a table mounted pivotally on said machine base and adapted for placement of a workpiece to be sawn, said table being rotatable about a horizontal axis that extends in a longitudinal direction of said machine base;

a C-shaped blade-holding arm fixed on said machine base, and having upper and lower arm portions that extend in the longitudinal direction of said machine base;

a generally vertical saw blade;

a saw-blade driving device including a motor disposed within said machine base and provided with a motor shaft that extends in the longitudinal direction of said machine base, and a linkage interconnecting said motor shaft and said saw blade so as to reciprocate said saw blade relative to said blade-holding arm, wherein said motor shaft is provided with an eccentric wheel member that is sleeved fixedly and eccentrically thereon, said linkage including;

an upper swing arm having a middle portion that is disposed pivotally within said upper arm portion of said blade-holding arm so that said upper swing arm rotates about a horizontal axis that extends in a transverse direction of said machine base, a front end with an upper chuck that is connected thereto and that holds an upper end of said saw blade thereon, and a rear end, a lower swing arm having a middle portion that is disposed pivotally within said lower arm portion of said blade-holding arm so that said lower swing arm rotates about another horizontal axis that extends in the transverse direction of said machine base, a front end with a lower chuck that is connected thereto and that holds a lower end of said saw blade thereon, and a rear end, a generally vertical link having an upper end and a lower end, a horizontal upper pivot pin connecting said upper end of said link rotatably to said rear end of said upper swing arm, a horizontal lower pivot pin connecting said lower end of said link rotatably to said rear end of said lower swing arm, a driving rod having an upper end and a lower end, an upper spherical plain bearing interconnecting said rear end of said upper swing arm and said upper end of said driving rod, and a lower spherical plain bearing interconnecting said eccentric wheel member and said lower end of said driving rod so as to rotate said lower end of said driving rod about said motor shaft, thereby moving said upper end of said driving rod vertically relative to said machine base and consequently swinging said upper and lower swing arms reciprocally, wherein said saw blade is held between said front ends of said upper and lower swing arms and extends perpendicularly through said table.

2. The scroll saw as defined in claim 1, wherein said motor further includes a counterweight plate that is sleeved fixedly on said motor shaft and that is formed integrally with said eccentric wheel member.

3. The scroll saw as defined in claim 1, wherein said rear end of said upper swing arm is formed with a link-extension hole for extension of said upper end of said link therethrough.

4. The scroll saw as defined in claim 1, wherein said driving rod has an upper sleeve-accommodating hole formed through said upper end thereof, and two upper fastener holes that are formed therethrough below said upper sleeve-accommodating hole and that are arranged one above another, said upper swing arm further having a rear end surface that is formed with a threaded hole, said linkage further including:

an upper coupler having a side surface that includes two threaded holes, a bearing-accommodating counterbore for receiving said upper spherical plain bearing therein, and two parallel ribs that are formed on two opposite sides of said side surface of said upper coupler so as to define a rod-confining space therebetween, within which said upper end of said driving rod is received fittingly, said upper end of said driving rod being located between said upper coupler and said rear end of said upper swing arm, two upper set screws extending through said upper fastener holes in said driving rod to engage said threaded holes in said upper coupler, thereby fixing said upper coupler to said upper end of said driving rod, an upper spacer sleeve confined within said upper sleeve-accommodating hole in said driving rod, and an upper lock bolt extending through said counterbore in said upper coupler, said upper spherical plain bearing, and said upper spacer sleeve to engage said threaded hole in said rear end surface of said upper swing arm, whereby, when said motor shaft rotates, said upper spherical plain bearing moves vertically and reciprocally relative to said machine base.

5. The scroll saw as defined in claim 1, wherein said driving rod has a lower sleeve-accommodating hole formed through said lower end thereof, and two lower fastener holes that are formed therethrough above said lower sleeve-accommodating hole and that are arranged one above another, said eccentric wheel member having a rear end surface that is formed with a threaded hole in a center thereof, said linkage further including:

a lower coupler having a side surface that includes two threaded holes, a bearingaccommodating counterbore for receiving said lower spherical plain bearing therein, and two parallel ribs that are formed on two opposite sides of said side surface of said lower coupler so as to define a rod-confining space therebetween, within which said lower end of said driving rod is received fittingly, said lower end of said driving rod being located between said lower coupler and said eccentric wheel member, two lower set screws extending through said lower fastener holes in said driving rod to engage said threaded holes in said lower coupler, thereby fixing said lower coupler to said lower end of said driving rod, a lower spacer sleeve confined within said lower sleeve-accommodating hole in said driving rod, and a lower lock bolt extending through said counterbore in said lower coupler, said lower spherical plain bearing, and said lower spacer sleeve to engage said threaded hole in said rear end surface of said eccentric wheel member.

6. The scroll saw as defined in claim 1, wherein said blade-holding arm includes two vertically spaced pairs of adjacent limiting projections, each pair of said adjacent limiting projections flanking and being spaced apart from said link, thereby confining said link therebetween.

* * * * *